(12) United States Patent
Leontitsis et al.

(10) Patent No.: US 11,183,842 B2
(45) Date of Patent: Nov. 23, 2021

(54) METHOD AND SYSTEM FOR DETERMINING ENERGY CONSUMPTION OF A PROPERTY

(71) Applicant: BRITISH GAS TRADING LIMITED, Windsor (GB)

(72) Inventors: Alexandros Leontitsis, Sutton (GB); Jim Anning, Reading (GB); Oliver Parson, London (GB); Stephen Wood, London (GB); Miroslav Hamouz, Cambridge (GB)

(73) Assignee: BRITISH GAS TRADING LIMITED, Windsor (GB)

(*) Notice: Subject to any disclaimer, the term of this patent is extended or adjusted under 35 U.S.C. 154(b) by 679 days.

(21) Appl. No.: 15/768,322

(22) PCT Filed: Oct. 13, 2016

(86) PCT No.: PCT/GB2016/053173
§ 371 (c)(1),
(2) Date: Apr. 13, 2018

(87) PCT Pub. No.: WO2017/064492
PCT Pub. Date: Apr. 20, 2017

(65) Prior Publication Data
US 2018/0301902 A1  Oct. 18, 2018

(30) Foreign Application Priority Data
Oct. 14, 2015  (GB) .................. 1518211

(51) Int. Cl.
*H02J 3/14*  (2006.01)
*G06Q 10/04*  (2012.01)
(Continued)

(52) U.S. Cl.
CPC ............. *H02J 3/14* (2013.01); *G01D 4/002* (2013.01); *G01D 4/004* (2013.01); *G01D 4/006* (2013.01);
(Continued)

(58) Field of Classification Search
CPC ........ G01D 4/002; G01D 4/004; G01D 4/006; G01D 4/008; G06Q 10/04;
(Continued)

(56) References Cited

U.S. PATENT DOCUMENTS

2011/0301894 A1  12/2011  Sanderford, Jr.
2011/0302125 A1  12/2011  Shetty et al.
(Continued)

FOREIGN PATENT DOCUMENTS

EP  2026299 A1  2/2009
EP  2535997 A2  12/2012
(Continued)

OTHER PUBLICATIONS

United Kingdom, UK Search Report for GB1518211.6, date of search Apr. 13, 2016, 4 pages.
(Continued)

*Primary Examiner* — Roy Y Yi
*Assistant Examiner* — Geoffrey T Evans
(74) *Attorney, Agent, or Firm* — Tucker Ellis LLP; Michael G. Craig

(57) ABSTRACT

In one aspect, there is described a method having: receiving energy consumption data from one or more electricity and/or gas meters associated with a property having one or more devices having larger devices and/or smaller devices; receiving context information data about the property; retrospectively determining, in the received energy consumption data, one or more variations indicative of consumption of the devices; identifying one or more events associated with the
(Continued)

devices, based on the determined variations; classifying the identified events into predetermined sub-categories associated with the devices, based on the energy consumption data and the context information data; and associating a proportion of the received energy consumption data to respective predetermined categories associated with the devices, based on the classification in the sub-categories.

19 Claims, 11 Drawing Sheets

(51) Int. Cl.
*G06Q 50/06* (2012.01)
*G01D 4/00* (2006.01)
*H02J 3/00* (2006.01)
*G06Q 10/08* (2012.01)
*G06Q 10/06* (2012.01)

(52) U.S. Cl.
CPC .............. *G01D 4/008* (2013.01); *G06Q 10/04* (2013.01); *G06Q 50/06* (2013.01); *G06Q 10/06315* (2013.01); *H02J 3/003* (2020.01); *H02J 2310/14* (2020.01)

(58) Field of Classification Search
CPC .............. G06Q 10/06315; G06Q 50/06; H02J 2310/14; H02J 3/003; H02J 3/14; Y02B 70/30; Y02B 70/3225; Y04S 20/222; Y04S 20/242; Y04S 20/30
See application file for complete search history.

(56) References Cited

U.S. PATENT DOCUMENTS

| 2018/0096439 | A1* | 4/2018 | Davies | G06Q 30/04 |
| 2018/0285788 | A1* | 10/2018 | Andrei | G06F 16/287 |
| 2018/0285988 | A1* | 10/2018 | Leontitsis | G01D 4/006 |

FOREIGN PATENT DOCUMENTS

| GB | 2475172 A | 5/2011 |
| GB | 2491109 A | 11/2012 |
| WO | 2012/106709 A2 | 8/2012 |
| WO | 2012156758 A1 | 11/2012 |
| WO | 2015/059272 A1 | 4/2015 |
| WO | 2015/073997 A2 | 5/2015 |

OTHER PUBLICATIONS

United Kingdom Search Report for GB1614870.2, date of search Feb. 17, 2017, 4 pages.
PCT International Search Report and Written Opinion from the International Application PCT/GB2016/053173, dated Nov. 29, 2016, 11 pages.
PCT International Search Report and Written Opinion from the International Application PCT/GB2016/053175, dated Nov. 29, 2016, 11 pages.
EP Communication pursuant to Article 94(3) from the corresponding European Patent Application No. 16784249.1, dated Jun. 29, 2021, 10 pages.
EP Communication pursuant to Article 94(3) from the corresponding European Patent Application No. 16784250.9, dated Jun. 29, 2021, 8 pages.

* cited by examiner

METHOD AND SYSTEM FOR DETERMINING ENERGY CONSUMPTION OF A PROPERTY

CROSS-REFERENCE TO RELATED APPLICATIONS

This application claim priority to Great Britain Patent Application Serial No. 1518211.6 entitled METHOD AND SYSTEM FOR DETERMINING ENERGY CONSUMPTION OF A PROPERTY, filed Oct. 14, 2015, of which is incorporated herein by reference.

BACKGROUND

This disclosure relates, but is not limited, to a method, a computer readable medium, a system or apparatus for determining energy consumption associated with a property.

It is known to provide feedback for energy saving to a client associated with a property comprising a plurality of appliances, using monitoring energy consumption of one or more appliances within the property.

However the above known techniques require data from at least one sensor connected to the appliance for the monitoring of the energy consumption of one or more appliances within said property. Such sensor and/or data may be difficult to obtain.

SUMMARY

Aspects and embodiments of the invention are set out in the appended claim. These and other aspects and embodiments of the invention are also described herein.

The disclosure relates to a method for determining where energy consumption of a property is happening.

The method comprises receiving energy consumption data from the electricity and/or gas meters associated with the property and context information about the property, and determining variations indicative of switching on or off of devices of the property. The method also comprises identifying one or more events associated with the devices, based on the determined variations, and classifying the identified events into predetermined sub-categories associated with the devices. The method also comprises associating a proportion of the energy consumption to respective predetermined categories associated with the devices, based on the classification in the sub-categories.

In some examples, the energy consumption data is received and collected periodically and over a predetermined monitoring period, and the analysis of the received and collected data is performed retrospectively. The period of receiving may be relatively short, such as an hour, and the predetermined monitoring period may be relatively long, such as for example a half day or several days (such as a week).

The disclosure also relates to a system, a computer program product and apparatus for implementing the method.

BRIEF DESCRIPTION OF DRAWINGS

Embodiments of the present invention will now be described, by way of example, with reference to the accompanying drawings, in which.

DETAILED DESCRIPTION

Figure 1:
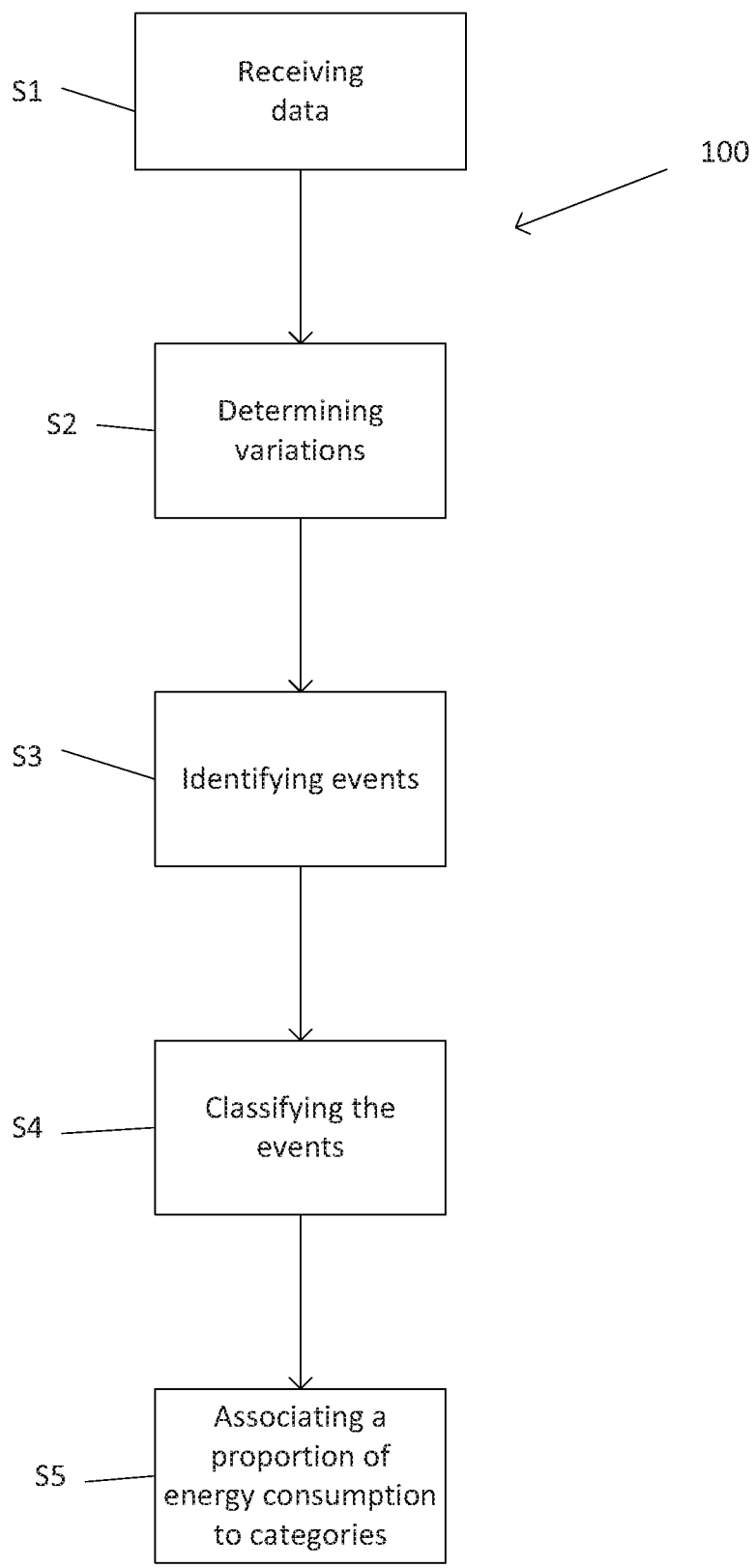
FIG. 1 shows a flow chart illustrating an example method according to the disclosure.

The example illustrated in FIG. 1 shows a flow chart illustrating an example method 100 according to the disclosure.

The method 100 of FIG. 1 comprises receiving, in S1, data.

In some examples, the receiving of the data of S1 may comprise receiving, at least hourly and over a predetermined monitoring period of time of at least one half day, energy consumption data from one or more electricity and/or gas meters associated with a property comprising one or more devices comprising larger devices and/or smaller devices. As explained below, the devices of the property may comprise larger devices and/or smaller devices.

In some examples, the receiving of the data of S1 may comprise receiving context information about the property.

The method 100 comprises retrospectively determining, in S2, in the received energy consumption data, one or more positive energy consumption variations indicative of switching on of one or more of the devices and/or one or more negative energy consumption variations indicative of switching off of one or more of the devices.

The method 100 also comprises, in S3, identifying one or more events associated with the devices, based on the determined variations, by matching one or more positive variations with one or more negative variations.

The method 100 also comprises, in S4, classifying the identified events into predetermined sub-categories associated with the devices. In some examples the classifying may be based on the energy consumption data and the context information data.

The method 100 also comprises, in S5, associating a proportion of the received energy consumption data to respective predetermined categories associated with the devices, based on the classification in the sub-categories.

Figure 2:
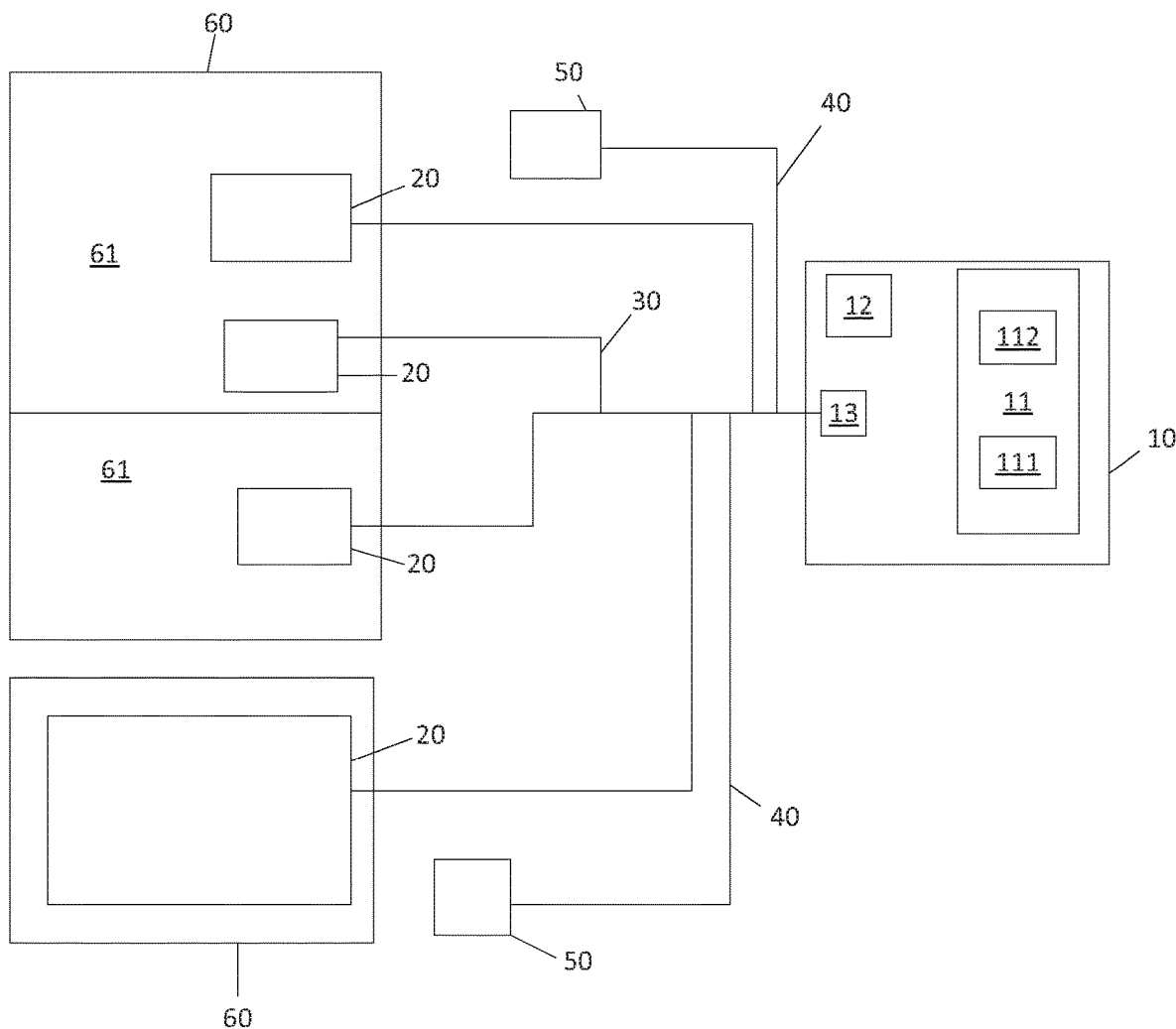
FIG. 2 schematically illustrates an example system configured to implement the example method of FIG. 1.

FIG. 2 schematically illustrates an example system 10 configured to implement the example method of FIG. 1.

The system 10 of FIG. 2 comprises at least a memory 11, a processor 12 and a communications interface 13.

The memory 11 is configured to store data, for example for use by the processor 12.

In FIG. 2, the system 10 is configured to communicate with one or more meters 20, via the interface 13 and a first link 30 between the interface 13 and the meters 20.

The memory 11 may also comprise a first database server 111 configured to store data received from the meters 20 over the link 30.

The system 10 of FIG. 2 is also configured to be connected to one or more user interfaces 50, via the interface 13 and a second link 40 between the interface 13 and the user interfaces 50.

The memory 11 may also comprise a second database server 112 configured to store data received from the user interfaces 50 over the link 40.

In FIG. 2, each of the meters 20 is one of a gas meter or an electricity meter. At least some of the meters are configured to generate one or more readings comprising energy consumption data. In some example, the energy consumption data may be associated with energy (for example in kW·h (kWh)) and/or power (for example in Watts or kilo-Watts) and/or volume of gas (for example in cubic meters).

In some examples, at least some of the meters 20 may be classical meters. In that example, the readings are displayed on a user interface of the meter 20, and need to be transmitted to the system 10 by a client associated with the property or by an operator of the utility provider (electricity and/or gas) as non-limiting examples. The readings can be transmitted to the system 10 using the user interfaces 50.

In some examples, at least some of the meters 20 may comprise an automatic meter reading functionality. The automatic meter reading functionality may be configured to automatically collect the energy consumption data relating to the meter 20, and transfer the data to the system 10 over the first link 30. The period between each transfer may correspond, for examples, to a billing period, such as a month, a quarter, or a year as non-limiting examples.

In some examples, at least some of the meters 20 may be smart meters. The smart meters are meters comprising an automatic meter reading functionality, as well as other functionalities, for example for communication to the system 10, such as short term readings (for example a reading may be generated every half hour or every 10 seconds) and/or real-time or near real-time readings, and/or power outage notification and/or power quality monitoring, as non-limiting examples.

In FIG. 2, the meters 20 are associated with a property 60. As shown in FIG. 2, a property 60 may comprise one or more meters 20.

As shown in FIG. 2, a property 60 may comprise one or more premises 61.

A contract with a utility provider (such as electricity and/or gas provider) may be associated with one or more premises 61 and/or one or more properties 60.

Devices consuming energy, such as gas and/or electricity, are located within the property 60 and the meters 20 are configured to record the energy consumption of the devices.

The devices may comprise at least one of the following, as non-limiting examples: boiler and/or electrical heater and/or air conditioning system, lighting bulbs, fridge, washing-machine, drier, dish-washer, oven and/or cooker and/or hob, television, set-top box, dvd or cd player, Wi-Fi access points, and other appliances such as hair drier, blender, alarm clock, hoover, etc.

In some examples, predetermined categories may be associated with the devices, and may comprise at least one of:

Appliances (associated with, for example, fridge, washing-machine, drier, dish-washer, hair drier, blender, alarm clock, hoover);

Cooking (associated with, for example, oven and/or cooker and/or hob);

Heating (associated with, for example, boiler and/or electrical heater);

Cooling (associated with, for example, air conditioning system);

Hot Water (associated with, for example, boiler and/or electrical heater);

Entertainment (associated with, for example, television, set-top box, dvd or cd player and/or wi-fi access points); and Lighting (such as lighting bulbs).

In some examples, sub-categories may be associated with the appliances, and may comprise at least one of: smaller appliances (such as fridge and alarm clock, as non-limiting examples) and larger appliances (such as washing machine and hoover, as non-limiting examples).

The user interface 50 may be a user interface of a communications device associated with a client associated to the property 60 and/or a device associated with an operator of the utility provider (electricity and/or gas) and/or a device associated with a third party.

The device may comprise at least one of a computer, a telephone, such as a cell phone, a personal digital assistant (PDA), a laptop or electronic notebook, a smart phone, a tablet, any other type of smart device, and/or a server of the operator and/or a server of a third party, as non-limiting examples.

In some examples, the system 10 is configured to receive, at S1, energy consumption data from one or more electricity and/or gas meters 20 associated with a property 60 comprising one or more devices comprising larger devices and/or smaller devices, and context information data.

In some examples, the system 10 is configured to determine, at S2, in the received energy consumption data, one or more positive energy consumption variations indicative of switching on of one or more of the devices and/or one or more negative energy consumption variations indicative of switching off of one or more of the devices.

In some examples, the system 10 is configured to identify, at S3, one or more events associated with the devices, based on the determined variations, by matching one or more positive variations with one or more negative variations.

In some examples, the system 10 is configured to classify, at S4, the identified events into predetermined sub-categories associated with the devices.

In some examples, the system 10 is configured to associate a proportion of the received energy consumption data to respective predetermined categories associated with the devices, based on the classification in the sub-categories.

The processor 12 of the system 10 may be configured to perform, at least partly, at least some of the steps of the above method. Alternatively or additionally, some of the steps of the above method may be performed, at least partly, by another entity in the system 10, such as the server 111 or 112 as non-limiting examples.

Figure 3A:
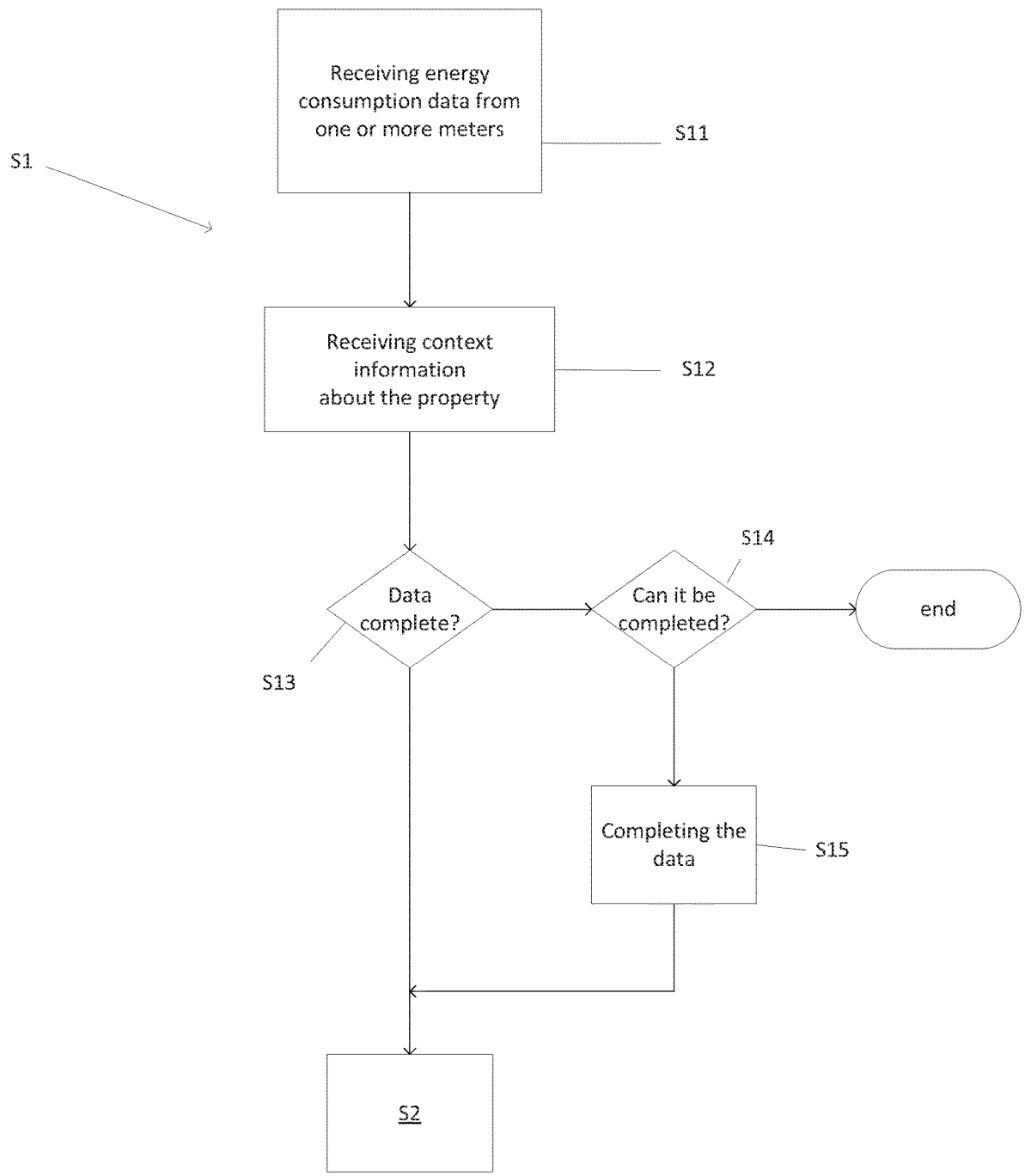
FIG. 3A shows a flow chart illustrating an example detail of a method according to the disclosure.

In the example of FIG. 3A, S1 may comprise, at S11, periodically receiving readings from the electricity and/or gas meters over a predetermined monitoring period of time.

In some examples, the period for receiving the readings is of the order of the hour, that is to say that a reading is received every hour or every half hour. Alternatively or additionally, the period for receiving the readings is of the order of the minute, that is to say that a reading is received every ten minutes, or every two minutes or every minute. Alternatively or additionally, the period for receiving the readings is of the order of the second, that is to say that a reading is received every 30 seconds or every 10 seconds or every second.

In some examples, the predetermined monitoring period of time is of the order of the year, such as a year or a half year, of the order of the month, such as 3 months (a quarter), or one month or a half month, or of the order of the day, such as a 7 days, or a day or a half day.

In the example of FIG. 3A, S1 may comprise, at S12, receiving context information about the property.

In some examples, the context information about the property is at least one of:

information about the property; and information about the environment of the property.

In some examples, the information about the property comprises at least one of:

location of the property, such as a ZIP code, a postal code, GPS coordinates or an address;

a fuel type of the property, such as electricity, gas, both or none;

a profile of the property, such as a fuel type for cooking in the property, a fuel type for heating the property, a fuel type for cooling the property, and a fuel type for hot water in the property;

electricity and/or gas information about the property, such as the line voltage in at least part of the property and/or data from dedicated sensors or devices configured to monitor energy consumption and/or operation of one or more devices; and information about the devices, such as the type of the devices and the mode of operation of the devices; and information about clients associated with the property, such as number of clients, and location of the clients.

In some examples, the context information about the property may be provided to the system via the interfaces 50.

In some examples, the location of the property may be provided by a client associated with the property or inferred by an operator of the service provider from an address of the property.

In some examples, the fuel type of the property (electricity and/or gas) is usually known by an operator of the service provider.

In some examples, the profile of the property may be provided by a client associated with the property, in response to a request by an operator for example.

In some examples, the electricity and/or gas information about the property may be provided by sensors associated with the property, such as line voltage sensors and/or data from dedicated sensors or devices configured to monitor energy consumption and/or operation (such as on/off) of one or more devices. In some examples, the electricity and/or gas information may be inferred by the operator from data provided by a device and/or a third party associated with both the client and the property. In some examples the operator may infer when heating and/or cooling is on from provided data associated with the temperature internal to the property and the set temperature of the thermostat.

In some examples, the information about the devices may be provided by a client associated with the property, in response to a request by an operator for example. The client may provide the information, such as the number of televisions within the property, the type and/or model of the washing machine, etc. Alternatively or additionally, the information about the devices may be inferred from an input from a third party (such as an internet service provider). In some cases, as non-limiting examples, tracking of internet browsing history of and/or online purchase may allow inferring information about the devices within the property, such as the type and/or model of a washing machine recently bought by the client.

In some examples, the information about the clients associated with the property may be provided by a client associated with the property, in response to a request by an operator for example. The client may provide input about the number of people usually living in the property. The client may also provide input about periods of holidays where the property is expected to be empty. Alternatively or additionally, the information about the clients may be inferred from an input from a third party (such as an internet service provider and/or mobile telephony providers, as non-limiting examples). In some cases, tracking of internet browsing history of and/or online purchase and/or mobile phone location may allow inferring information about the clients within the property, such as periods of expected holidays, location of the clients using mobile phone and/or Wi-Fi location tracking as non-limiting examples.

In some examples, the information about the environment of the property comprises at least one of:

time of the day and/or period of the year, one or more weather readings, a temperature associated with the outside temperature of the property, and/or sun elevation and/or cloud coverage in relation to the property.

In some examples, the context information about the environment of the property may be provided to the system 10 via the link 30.

In some examples, the time of the day and/or the period of the year may be inferred by the operator from the readings provided by the meters 20.

Alternatively or additionally, in some examples, the context information about the environment of the property may be provided to the system 10 via the interfaces 50.

In some examples, the weather readings and/or the outside temperature and/or sun radiation and/or the cloud coverage in relation to the property may be provided by a third party (such as a meteorological provider).

Alternatively or additionally, in some examples, the location of the property may enable to infer at least part of the information about the environment of the property, such as one or more weather readings and/or a temperature associated with the outside temperature of the property and/or sun radiation and/or cloud coverage in relation to the property.

In the above examples, the third party may be automated, and may for instance comprise a server.

It is understood that the context information may allow more accurate association of the proportion of the received energy consumption data to the respective predetermined categories associated with the devices.

At S13, it is determined whether the received data is complete.

If it is determined at S13 that the data is complete, then S2 is performed.

If it is determined at S13 that the data is not complete, then it is determined at S14 if the data can be completed.

If it is determined at S14 that the data cannot be completed, then the method outputs an incomplete data message and ends. For example, it is determined that the data cannot be completed when the amount of received energy consumption data is below a predetermined threshold, such as less than 50% of expected data.

If it is determined at S14 that the data can be completed, the data is completed at S15 with missing data. Then S2 is performed.

Below is an example of a method which may be performed at S15 for completing the data and which can be described with reference to FIG. 3B.

Figure 3B:
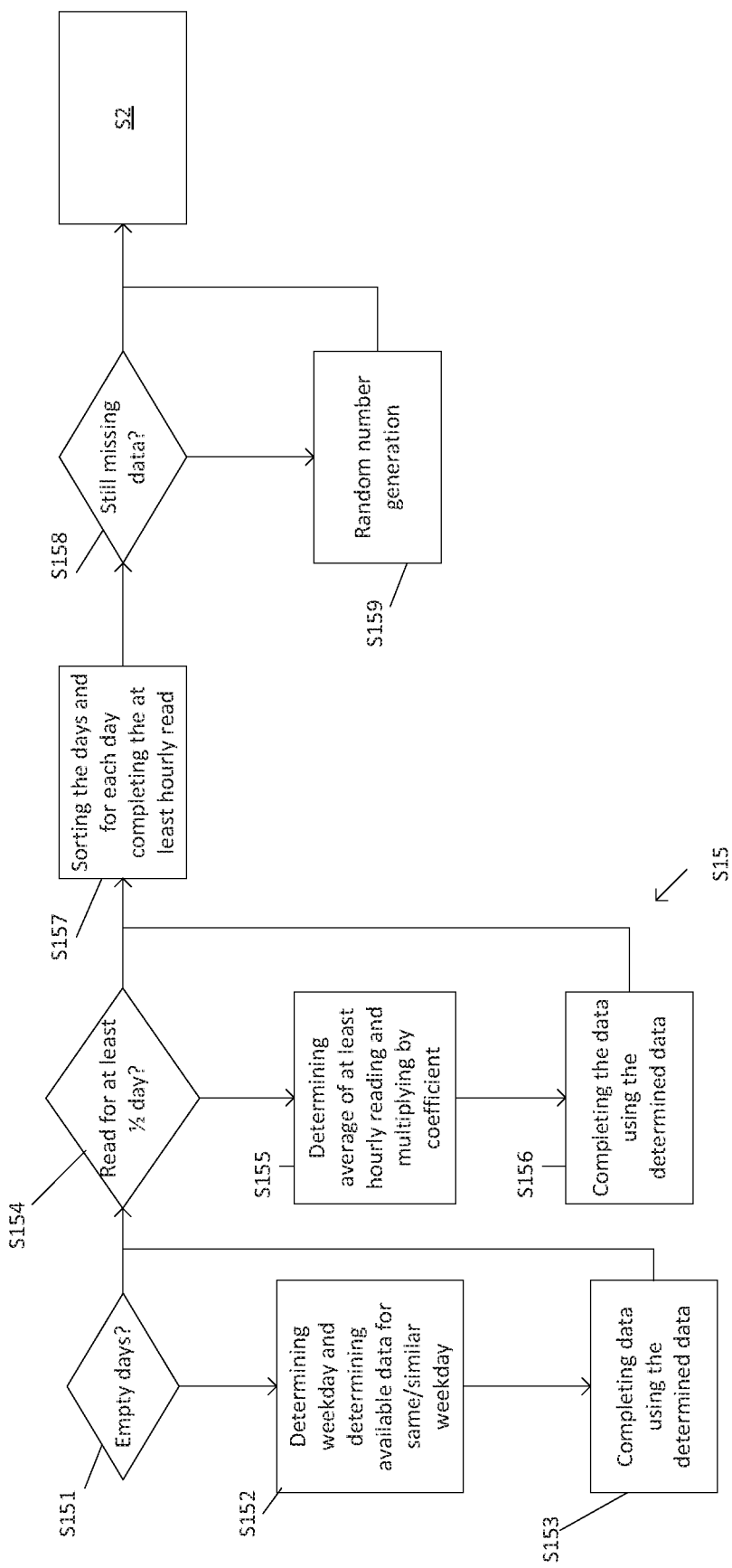
FIG. 3B shows a flow chart illustrating an example detail of a method for completing data according to the disclosure.

The method performed at S15 and illustrated by FIG. 3B may comprise determining at S151 if there are any days which are "empty days", i.e. days with no energy consumption data, such as no at least hourly readings (e.g. no Half-Hourly Readings) and no Read for a period of at least a Half-Day (i.e. the energy consumption for a predetermined monitoring period of time of at least one half day, such as e.g. a Daily Read). If it is determined at S151 that there are empty days in the data, then S152 may be performed, where the empty days may be completed.

In such an example, S152 may comprise determining which days of the week are empty, based on their date (which is known). In some examples, it may be determined, based on the determined empty weekdays, if energy consumption data (such as at least hourly reads and/or e.g. a Daily Read) is available for at least one same and/or similar weekday.

If it is determined that such energy consumption data is available, the determined available data (e.g. 48 half-hourly reads if available and/or a read for a period of at least a Half-Day (e.g. a Daily Read) if available) may be used at S153 to complete the data corresponding to the empty day.

If it is determined at S151 that there are no empty days or once S153 is performed, in the example of FIG. 3B, S154 may be performed where it may be determined whether all the days in the data have at least a read for a period of at least a Half-Day (e.g. a Daily Read). If it is determined at S154 that at least one day is missing e.g. a Daily Read, then S155 may be performed, where, for each day with the e.g. Daily Read missing, an average of the non-missing at least hourly energy consumption data may be calculated (e.g. the average of the haft-hourly readings e.g. increased by 1), and the average may be multiplied by a corresponding coefficient to obtain the e.g. Daily Read (e.g. in the case where the half-hourly reads are averaged, the coefficient may be 48). The obtained value may be used at S156 to complete the missing data corresponding to the day.

If it is determined at S154 that there are no days missing a read for a period of at least a Half-Day (e.g. the Daily Read) or once S156 is performed, in the example of FIG. 3B, S157 may be performed where:

the days may be sorted based on the quantity of missing data (e.g. from fewest missing values to most missing values);

for each day:
if the current day has no missing values, then do nothing;
else if the current day has one missing value, then subtract the sum of the non-missing values from the e.g. Daily Read, and use the obtained value as the missing value. In some examples, where the obtained value is lower than a minimum of the existing at least hourly reads (e.g. 47 half-hourly reads), then the obtained value may be set it to this minimum;
else if all of the at least hourly reads (e.g. 48 half-hourly reads) are missing, then complete the data using the data of the day whose e.g. Daily Read is closest to the current day; and else find the closest day in terms of the sum of the absolute difference of the at least hourly reads, and complete the data using the data from this closest day.

In some examples, the above steps may be repeated until there are no further or significant changes in the data in an iteration. In some examples, at the end of S157, all the days have at least one at least hourly read (e.g. half-hourly read).

After S157, in the example of FIG. 3B, S158 may be performed where it is determined if there are still missing data. If it is determined at S158 that there are still missing data, S159 may be performed where any data missing from the previous steps may be completed. At S159, the data may be completed using e.g. a Halton Sequence for random number generation. At S159, for each day with missing values, a random non-missing value may be picked, and be used to complete the missing ones using e.g. the Halton Sequence.

Figure 4:
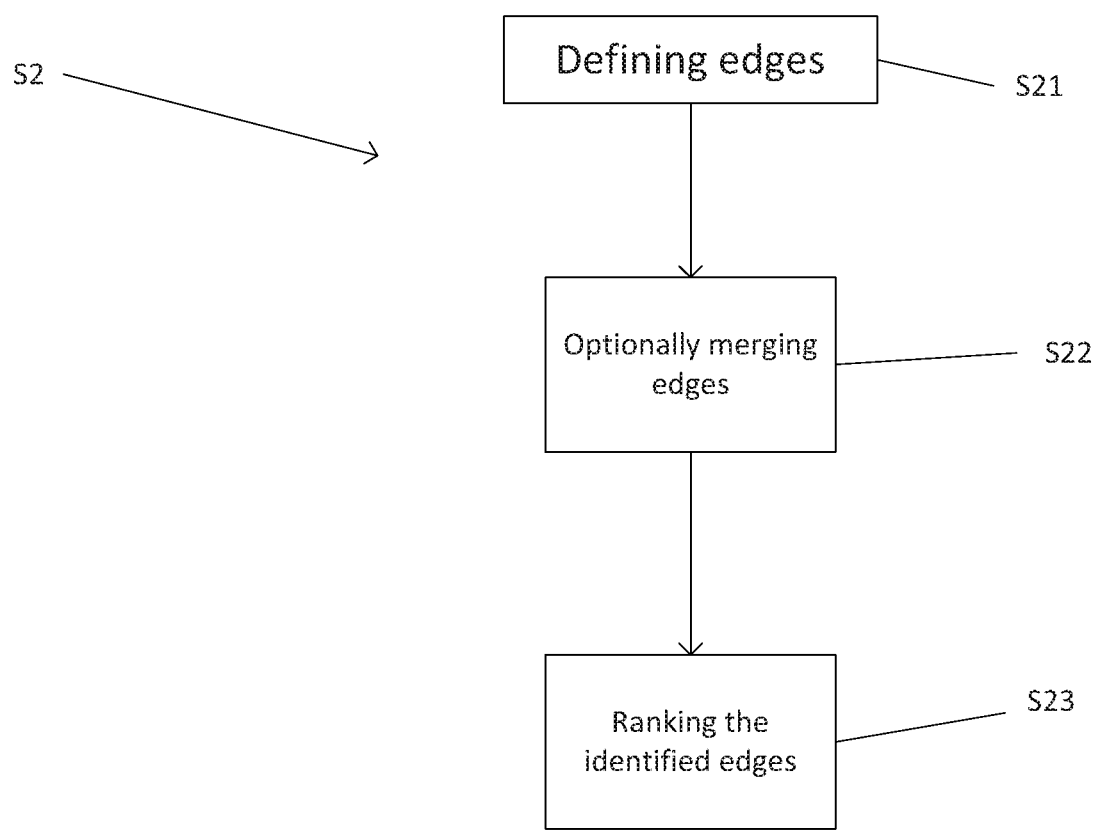
FIG. 4 shows a flow chart illustrating an example detail of a method according to the disclosure.

In the example of FIG. 4, S2 may comprise, at S21, defining edges between consecutive readings received from the electricity and/or gas meters. In some examples, S21 is performed for each of the meters 20.

Figure 5:
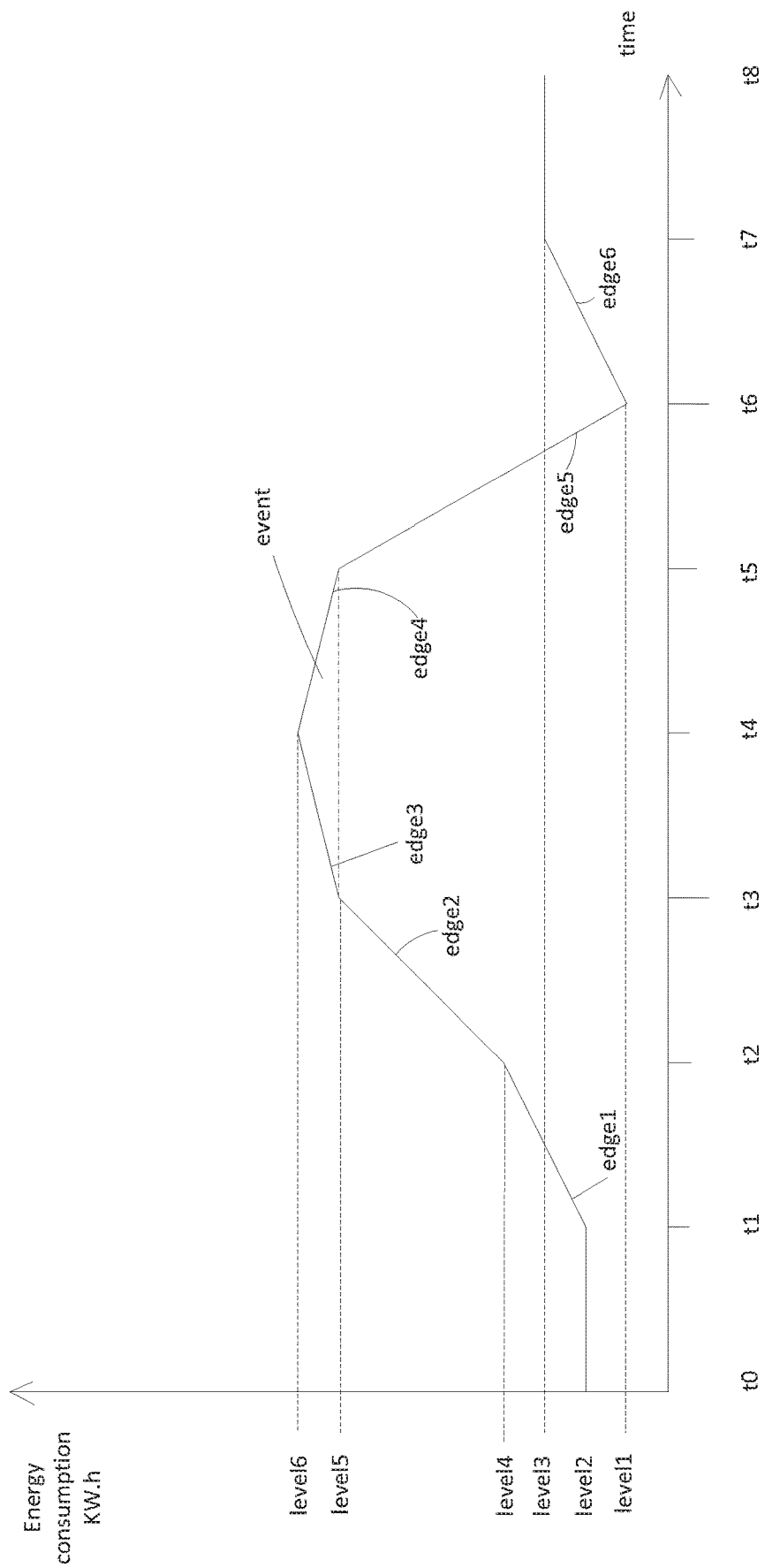
FIGS. 5, 6 and 7 schematically illustrate respective examples of a variation of the received energy consumption data (for example in kWh) over time.

FIG. 5 schematically illustrates an example of a variation of the received energy consumption data (for example in kWh), over time.

In the present disclosure, an edge corresponds to the difference of the energy consumption between two consecutive (i.e. contiguous) readings.

In the example of FIG. 5, readings are received at t0, t1, t2, t3, t4, t5, t6, t7 and t8. It is determined an edge1 between t1 and t2, an edge2 between t2 and t3, an edge3 between t3 and t4, an edge4 between t4 and t5, an edge5 between t5 and t6, and an edge6 between t6 and t7. No edge is determined between t0 and t1 or between t7 and t8 because there is no variation between those times.

Figure 6:
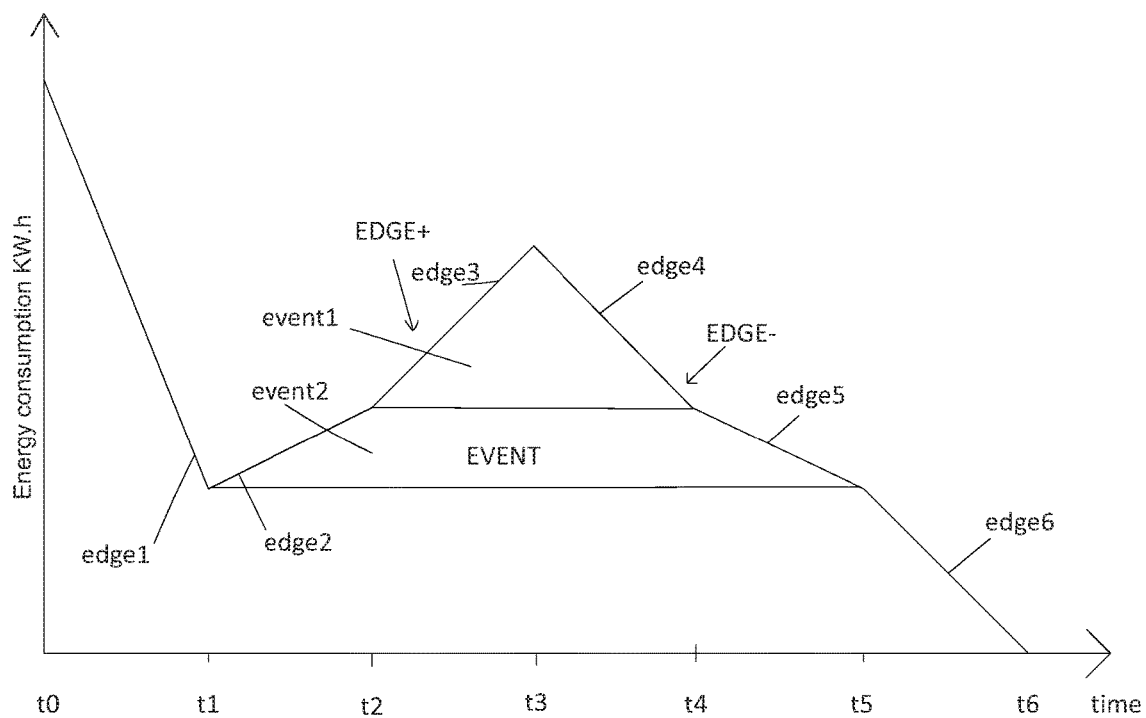

In the example of FIG. 6, readings are received at t0, t1, t2, t3, t4, t5 and t6. It is determined an edge1 between t0 and t1, an edge2 between t1 and t2, an edge3 between t2 and t3, an edge4 between t3 and t4, an edge5 between t4 and t5, and an edge6 between t5 and t6.

Figure 7:
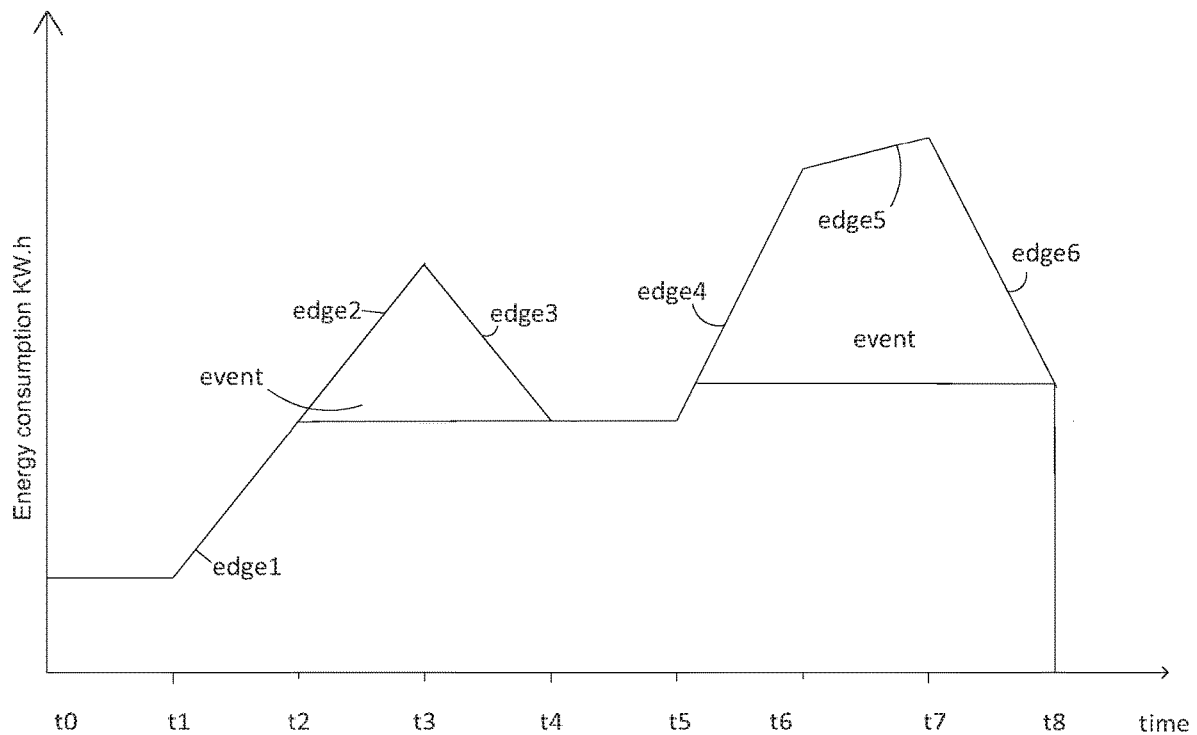

In the example of FIG. 7, readings are received at t0, t1, t2, t3, t4, t5, t6, t7 and t8. It is determined an edge1 between t1 and t2, an edge2 between t2 and t3, an edge3 between t3 and t4, and edge4 between t5 and t6 and an edge5 between t6 and t7 and an edge6 between t7 and t8. No edge is determined between t0 and t1 or between t4 and t5, because there is no variation between those times.

In the examples of FIGS. 5, 6 and 7, determining, in the received energy consumption data, one or more variations indicative of a switch on or a switch off a device comprises determining:

one or more on-edges, defined as edges which indicate that a device was on (in other words a positive variation); and one or more off-edges, defined as edges which indicate that a device was off (in other words a negative variation).

In other words, an on-edge defines an increase of energy consumption between two consecutive readings and an off-edge defines a decrease of energy consumption between two consecutive readings.

In some examples, the determining of the variations is based on a comparison of a ratio r with a threshold. In some examples, the ratio r may be defined by:

$$r = \frac{absolute\_value\_of\_difference\_in\_energy\_consumption\_for\_an\_edge}{basis\_level\_for\_the\_edge}.$$

In the example of FIG. 5, the ratio r redge1 for edge1 is calculated as follows:

$$redge1 = \frac{abs(level4 - level2)}{level2}$$

The ratio r redge2 for edge2 is calculated as follows:

$$redge2 = \frac{abs(level5 - level4)}{level4}$$

The ratio r redge5 for edge5 is calculated as follows:

$$redge5 = \frac{abs(level1 - level5)}{level1}$$

An edge is considered as valid (or in other words significant) if the ratio r for the edge is greater than a predetermined threshold T1. For example, T1 may be comprised between 20% and 80%, as non-limiting examples. The edges for which the ratio r is below T1 are considered as non-significant and disregarded.

It is understood that if the value of T1 is set too high (for example greater than 80%), a great number of edges will be discarded as being non-valid (or non-significant). If the value of T1 is set too low (for example lower than 20%), the number of edges to process will be important, as numerous edges will be considered as significant.

In the example of FIG. 4, S2 may comprise, at S22, optionally merging a plurality of consecutive, similar, determined variations into a single edge. In some examples, if the relative difference between the ratios r of two consecutive edges is below a predetermined threshold T2, then the two consecutive edges are considered as one single edge. For example, T2 may be comprised between 20% and 40%, as non-limiting examples. If the relative difference is above T2, then the two edges are not merged.

In the example of FIG. 6, edge2 and edge3 may be merged together as EDGE+. Similarly, edge4 and edge5 may be merged together as EDGE−.

In the example of FIG. 4, S2 may comprise, at S23, ranking the identified edges based on their respective energy magnitude, for example from the largest identified edge to the smallest identified edge.

Alternatively or additionally, in some examples, some of the smallest determined edges may be discarded at S23, as non-significant to avoid processing too much data.

In the present disclosure, an event may be defined as a match between an on-edge and a corresponding off-edge. Below are described some examples of how the matching may be performed.

Figure 8:
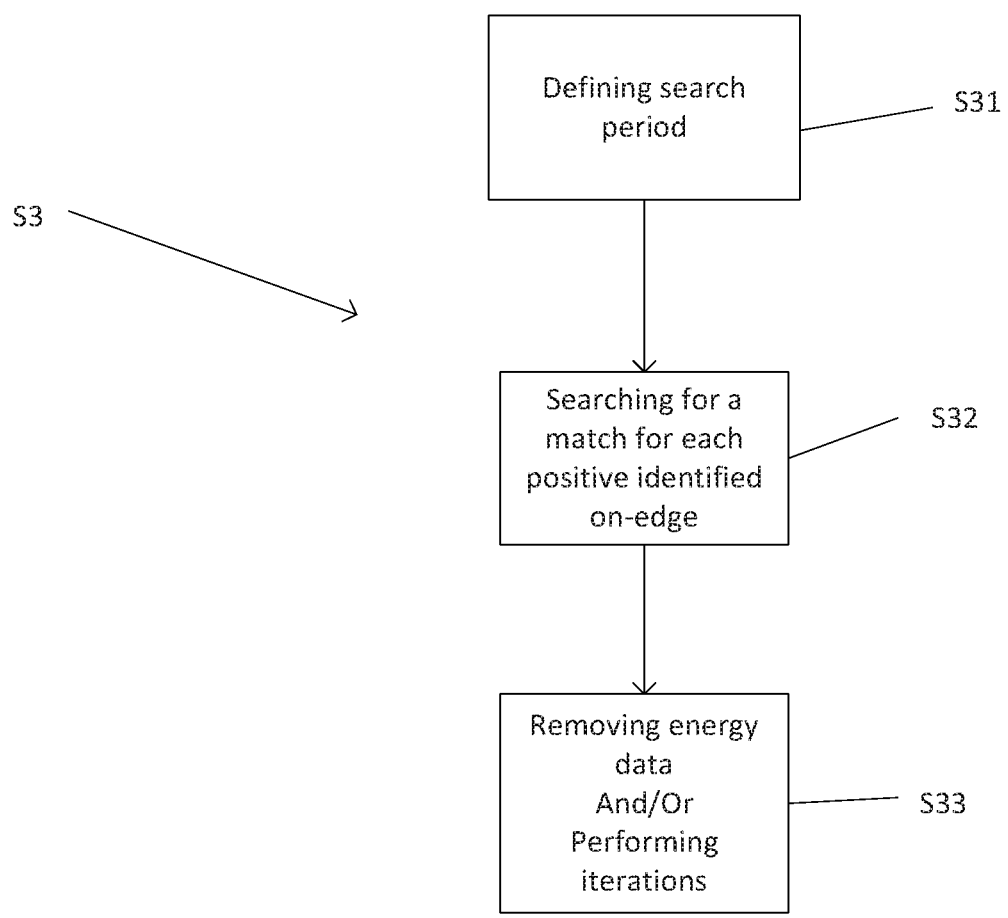
FIG. 8 shows a flow chart illustrating an example detail of a method according to the disclosure.

In the example of FIG. 8, S3 may comprise, at S31, defining a predetermined search period. The predetermined search period may correspond to the estimated maximum duration of an event, and the maximum search span for matching edges. The predetermined search period may be set for example at 24 hours (a day) as a non-limiting example.

For each on-edge, the method may comprise searching, within the predetermined search period, a matching off-edge among the off-edges.

In the example of FIG. 8, S3 may comprise, at S32, searching for a match to the positive variations (or on-edges) by iterations in successive turns, starting with the largest determined variation, and continuing in decreasing magnitude of variation.

In some examples, the matching can be performed based on similarity of basis level and/or magnitude of the ratio r and/or time of occurrence.

In the example of FIG. 5, the on-edges are as follows: edge1, edge2, edge3 and edge 6. In the example of FIG. 5, the off-edges are as follows: edge4 and edge5.

The method starts with edge2 (largest of the edges), and it is determined that edge4 and edge5 are not matching off-edges, because they are not similar in magnitude of ratio r or close in time of occurrence. No match is found.

The method then turns to edge1, and it is determined that edge4 and edge5 are not matching off-edges, because they are not similar in magnitude of ratio r or close in time of occurrence. No match is found.

With respect to edge3, it is determined that edge 4 is a matching off-edge, because it has a similar magnitude of ratio r (in the example of FIG. 4, the ratios for edge3 and edge4 are equal, although opposite in sign), and edge3 and edge4 happen at similar times, i.e. between t3 and t4 and between t4 and t5, respectively.

In the example of FIG. 5, it is thus determined that edge3 and edge4 define an event.

In the example of FIG. 6, the on-edges are as follows: edge2 and edge3. In the example of FIG. 6, the off-edges are as follows: edge1, edge4, edge5 and edge 6. With respect to edge3, the method determines that edge1, edge5 and edge6 are not matching off-edges, because they are not similar in magnitude of ratio r or close in time of occurrence. It is however determined that edge4 is a matching off-edge, because it has a similar magnitude of ratio r, and edge3 and edge4 happen at similar times, i.e. between t2 and t3 and between t3 and t4, respectively. In the example of FIG. 6, it is thus determined that edge3 and edge4 define an event1.

In the example of FIG. 7, the on-edges are as follows: edge1, edge2, edge4 and edge5. In the example of FIG. 7, the only off-edges are edge3 and edge6.

With respect to edge4, the method determines that edge6 is a matching off-edge, because it has a similar basis level.

In the example of FIG. 8, S3 may comprise, at S33, removing energy consumption data associated with an identified event from the search. In some examples, the removing S33 may occur even if S22 has been performed. Therefore, in the example of FIG. 7, it is determined that in the edge4 and edge6 define an event, regardless of edge5. In the example of FIG. 7, this means that the method may not try to find a match for edge 5, because edge5 is removed from the data when the event defined by edge4 and edge6 is identified. In the example of FIG. 7, the method thus proceeds with edge1, and the method determines that edge3 is not a matching off-edge, because it does not have a similar basis level. No match is found.

With respect to edge2 of FIG. 7, the method determines that edge3 is a matching off-edge, because it is similar in basis level, magnitude of ratio r and time of occurrence. In the example of FIG. 7, it is thus determined that edge2 and edge3 define an event.

Alternatively or additionally, in S33, the identifying can be performed by several iterations. In the example of FIG. 6, the event corresponding to matching edge3 and edge4 is first determined, the event corresponding to matching edges edge2 and edge5 being identified during a further iteration of the method.

Similarly, in the example of FIG. 7, once the method identifies an event defined by edge4 and edge6, the method may proceed to searching for a match for edge5 in a further iteration.

Alternatively or additionally, in the example of FIG. 7, EDGE+ may be matched to EDGE− and may define a single event referred to as EVENT.

Figure 9:
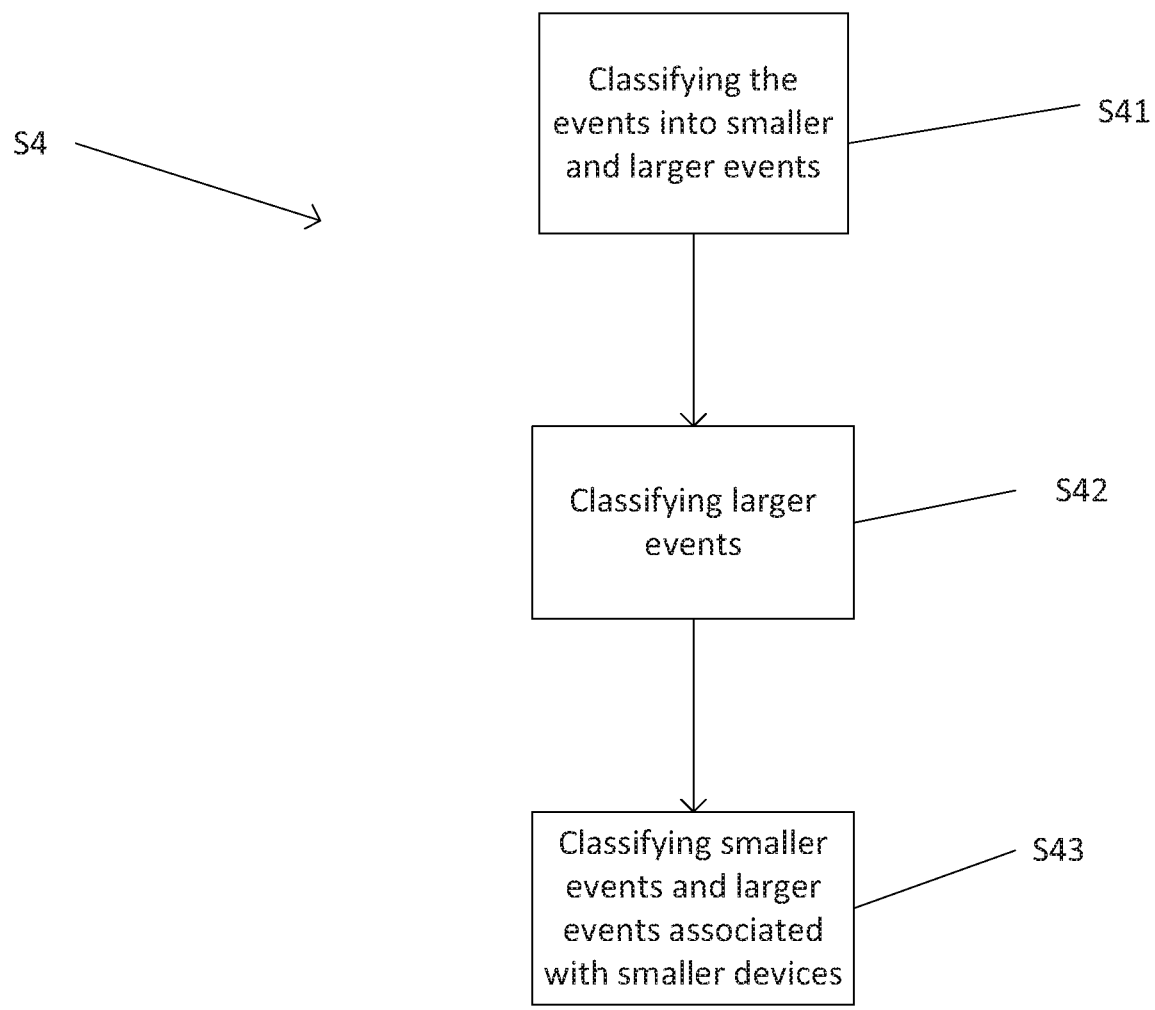
FIG. 9 shows a flow chart illustrating an example detail of a method according to the disclosure.

In the example of FIG. 9, S4 may comprise classifying, in S41, the identified events into larger events and smaller events, based on the energy magnitude of the identified events (for example in Watts·h or Watt hour (Wh)). In some examples, the threshold may be for example 150 Wh.

In the example of FIG. 9, S4 may comprise, at S42, classifying the events determined as larger events into a first set of predetermined sub-categories associated with the devices, the sub-categories comprising at least a predetermined sub-category associated with the smaller devices.

In the example of FIG. 9, S4 may comprise, at S43, classifying the energy consumption data, received from electricity meters and associated both with the events determined as smaller events and with the larger events classified into the predetermined sub-category associated with the smaller devices, into a second set of predetermined sub-categories associated with the smaller devices.

In some examples, S42 may comprise using a first classifier.

The classifier may use any one of a Support Vector Machine, a k nearest neighbours (k-NN) technique, Bayesian inference and/or a vector classifier using model-based clustering and expectation-maximization in an n-dimensional space.

In some examples, the vector classifier may be based on a first set of predetermined assumptions.

In some examples, the n-dimensions, with n=5, may comprise at least one of:
time of the event, such as the time of the day the event occurred,
energy magnitude of the event, such as the Log(Watts) of the event,
duration of the event,
fuel type of the event, such as gas and/or electricity,
likelihood of the event being a heating event (also called "heating likelihood" or "heating system"), such as the temperature T on which it is assumed that the event could be heating and/or likelihood of the event being a cooling event (also called "cooling likelihood" or "cooling system"), such as the temperature T on which it is assumed that the event could be cooling.

Figure 10:
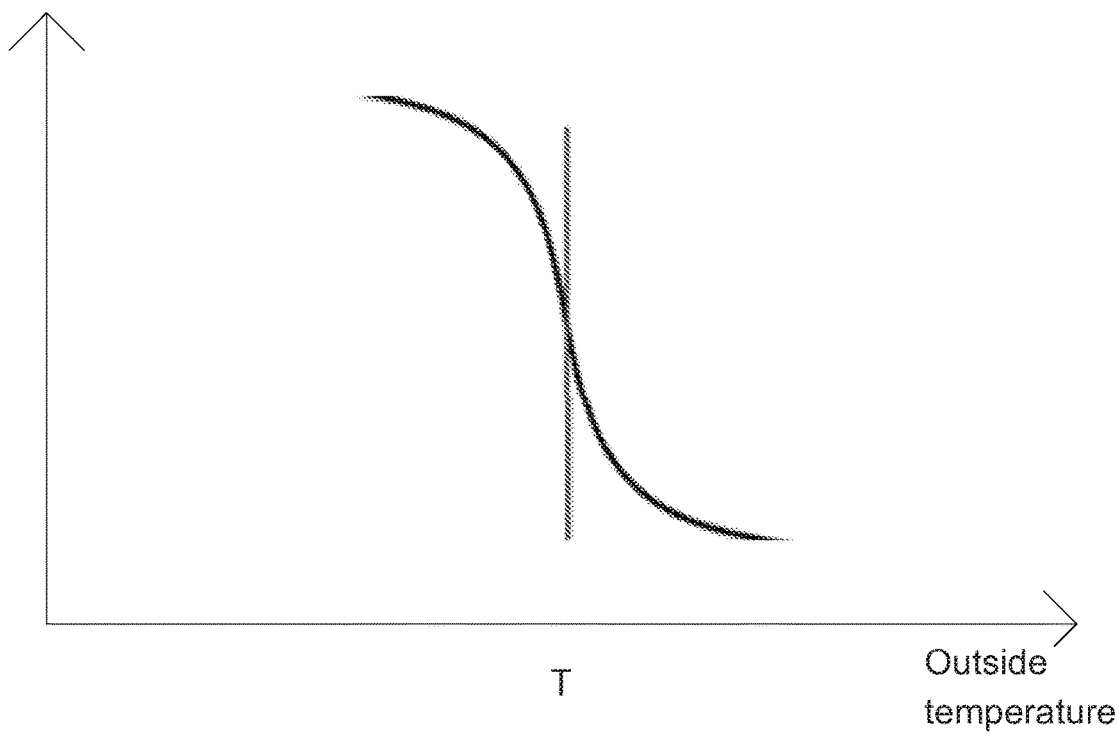
FIG. 10 schematically illustrates an example of a variation of the likelihood of an event being heating as a function of the outside temperature.

As shown in FIG. 10, the context information about the environment of the property may enable to determine a likelihood of the heating being on. The external temperature may enable to define, for each time of the day, and for each day of the year, the temperature T (for example in degree Celsius) at which heating may be on in the property. As shown in FIG. 10, this may be represented by a sigmoid function. In the example of FIG. 10, T is for example 19 C, which means that the likelihood is high if the outside temperature is below T, and low if the outside temperature is above T.

The sun radiation and the cloud coverage are also taken into account to approximate the likelihood more accurately. This is because, regardless of the outside temperature, the likelihood of the heating being on is when the cloud coverage is low and/or when the sun radiation is high.

The likelihood of the heating being on may be overridden by an input, for example via the interfaces 50, of electricity and/or gas information that the heating is definitely on.

As described in more detail below, the likelihood of the heating being on may be used as a dimension in the classifying.

It is understood that a Likelihood of Cooling (Cooling System) would be the opposite of the Likelihood of Heating (i.e. the Likelihood of Cooling is high when the Likelihood of Heating is low and vice versa).

In some examples, the first set of sub-categories may comprise at least one of:
Smaller Appliances,
Larger Appliances,
Heating,
Cooling,
Cooking, and
Hot Water.

The classifier uses a first set of predetermined assumptions, assumption being made for each one of the sub-categories.

Figure 12:
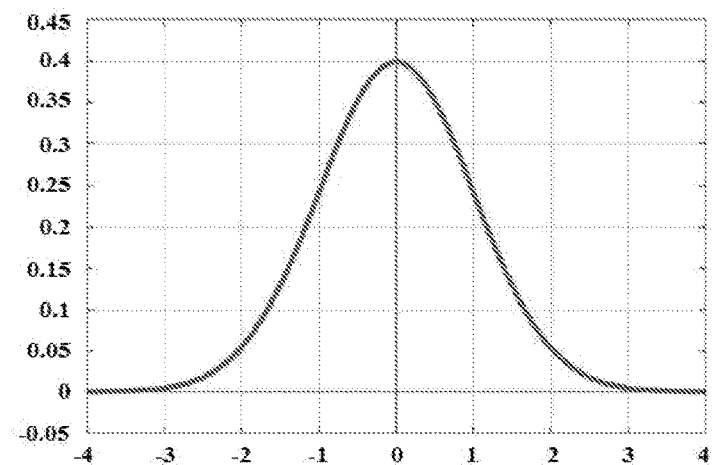
FIG. 12 schematically illustrates an example of a Normal distribution.
Figure 13:
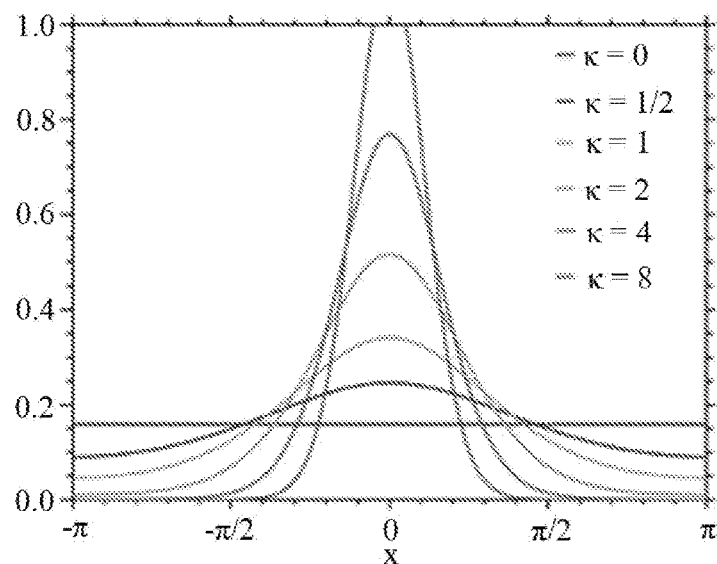
FIG. 13 schematically illustrates an example of a Von Mises distribution.

Assumptions for Small Appliances may comprise at least one of the following:
Uniformly distributed across the day (24 h),
Logarithms of their magnitude (Log(M)) follow a Normal distribution (as shown in FIG. 12),
Duration uniformly distributed,
Electricity-only powered,
Not affected by the heating or cooling likelihood Assumptions for Larger Appliances may comprise at least one of the following:
Distributed according to the Von Mises distribution (as shown in FIG. 13),
Logarithms of their magnitude (Log(M)) follow a Normal distribution (as shown in FIG. 12)
Duration distributed according to the Half Normal distribution,
Electricity-only powered,
Not affected by the heating or cooling likelihood.

Assumptions for Heating or Cooling may comprise at least one of the following:
Distributed according to the Von Mises distribution,
Logarithms of the magnitude (Log(M)) follow a Normal distribution,
Duration uniformly distributed,
Fuel type defined by the property/premises profile,
The temperature T at which heating (or cooling) may be on in the property defined by the Heating Likelihood (or Cooling Likelihood).

Assumptions for Cooking may comprise at least one of the following:
Distributed according to the Von Mises distribution,
Logarithms of the magnitude (Log(M)) follow a Normal distribution,
Duration distributed according to the Half Normal distribution,
Fuel type defined by the property/premises profile, Not affected by the heating or cooling likelihood Assumptions for Hot Water may comprise at least one of the following:

Distributed according to the Von Mises distribution,

Logarithms of the magnitude (Log(M)) follow a Normal distribution,

Duration distributed according to the Half Normal distribution,

Fuel type defined by the property/premises profile,

Not affected by the heating or cooling likelihood

Other assumptions may include, at least one of the following:

The cooking and the heating (or cooling) are more likely to occur only once per day, and/or All the dimensions are considered independent to each other, i.e. potential correlations are not considered.

Once the classifier has classified the identified larger events, using the above assumptions, the events are classified in the sub-categories Smaller Appliances, Larger Appliances, Heating (or Cooling), Cooking, and Hot Water.

The data streams associated with the electricity meters are further classified, for the smaller appliances and the smaller events. This is based on the assumption that the small appliances and the small events (assumed to be due to smaller devices) are only powered by electricity.

In the example of FIG. 9, S43 may comprise using a second classifier, for example to classify the energy consumption data into a second set of predetermined sub-categories. In some examples, the second classifier may involve an unsupervised learning technique.

In some examples, the second classifier may use at least one of a Support Vector Machine, Bayesian inference and/or a vector classifier using model-based clustering and expectation-maximization in an n-dimensional space.

In some examples, the vector classifier may be based on a second set of predetermined assumptions. In other words, in some examples, the data associated with the classified small appliances is added back to the data stream (such as shown on FIGS. 5, 6 and 7), and the second vector classifier may then classify the energy consumption data in an n-dimensional space. The smaller events may correspond, for examples, to an event associated with edge3 and edge4 in FIG. 5.

The n-dimensions, with n=2, may comprise at least one of:

time of the event, energy magnitude of the event.

Another dimension may be the likelihood of Lighting (also called "Lighting System").

Figure 11:
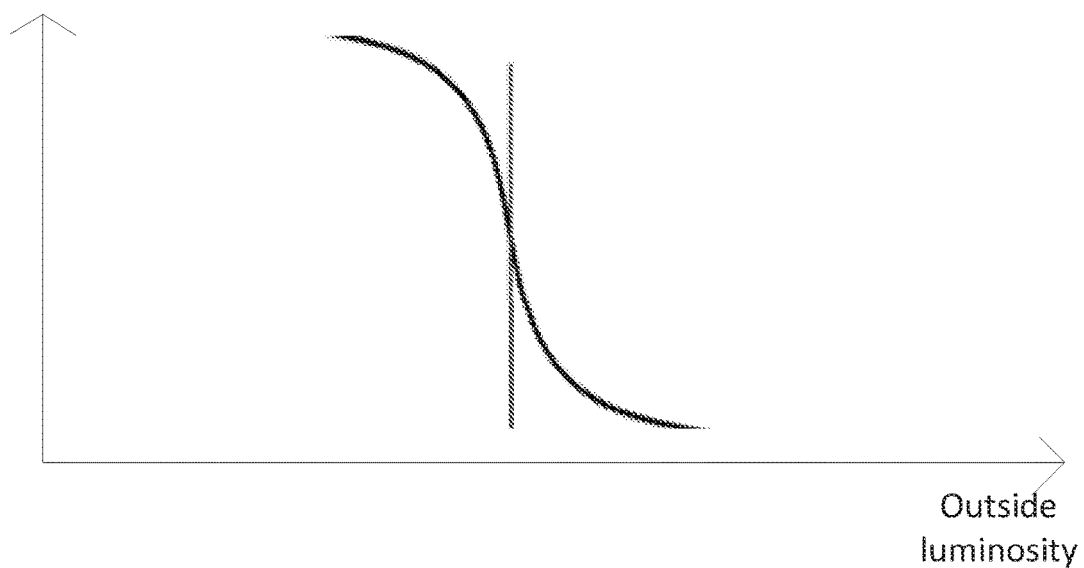
FIG. 11 schematically illustrates an example of a variation of the likelihood of an event being lighting as a function of the luminosity.

As shown in FIG. 11, the context information about the environment of the property may enable to determine a likelihood of the lighting being on. The sun radiation, the sun's elevation from the horizon, and/or the cloud coverage may also be taken into account to approximate the likelihood. The external luminosity may enable to define, for each time of the day, and for each day of the year, the luminosity L at which lighting may be on in the property. As shown in FIG. 11, this may be represented by a sigmoid function. In the example of FIG. 11 the likelihood is high if the outside luminosity is below L, and low if the outside luminosity is above L.

The time of day may also be taken into account. The likelihood of the lighting being on may be overridden by an input of electricity and/or gas information, for instance from an interface 50, that the lighting is definitely on.

As described in more detail below, the likelihood of the lighting being on may be used as a dimension in the classifying (to enable to classify between Entertainment and Lighting, as explained below), The second set of sub-categories may comprise at least one of:

Baseload, such as fridge or smaller devices always on (such as alarm clocks),

Entertainment, and

Lighting.

The classifier uses a second set of predetermined assumptions, assumption being made for each one of the sub-categories.

Assumptions for Baseload may comprise at least one of the following:

The magnitude (M) follows a Normal distribution,

Uniformly distributed across the day (24 h).

Figure 14:
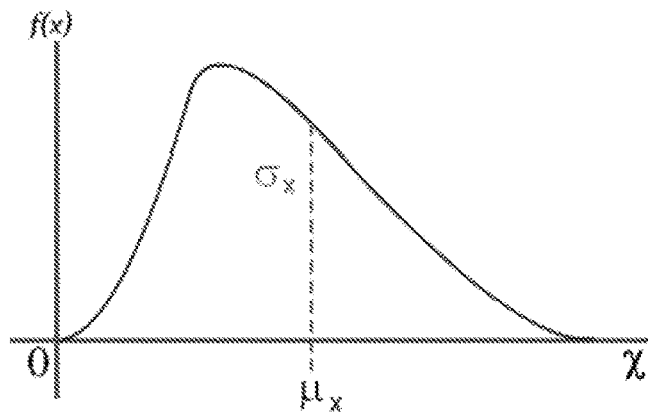
FIG. 14 schematically illustrates an example of a Log-Normal distribution.

Assumptions for Entertainment and Lighting may comprise at least one of the following:

The magnitude (M) follows a Log-Normal distribution (as shown in FIG. 14),

The magnitude (M) follows a Von Mises distribution across the day (24 h), and

Lighting Likelihood determined by the Lighting System.

In some examples, it is determined that whatever is smaller than the baseload is classified as baseload.

In some examples, for the gas meters, any leftovers which are not yet classified are classified as heating.

In some examples, the assumptions are modified by parameters and/or modifiers, comprising at least one of:

a proportion of missing data above which the method ends, such as the percentage of missing data above which the analysis is skipped;

a parameter K of the von Mises distribution (see FIG. 13), representing a Lifestyle parameter, a penalty to the probability of being cooking, heating, or hot water, if they are fueled by both electricity and gas, one or more factors associated with sun inclination from the horizon and/or cloud coverage, such as the degrees of sun inclination from the horizon for which the luminosity has a value 0.5, and/or the steepness of the luminosity function at a luminosity of value 0.5, a background on the data stream corresponding to smaller appliances, one or more factors associated with the external temperature, such as the external temperature on which the value 0.5 of the basic Heating and/or Cooling System output lies, and/or the fuzziness around the above temperature, and/or the shift in temperature of the clear sky in the day, and one or more factors associated with the initial set of durations of events that may be generated by larger appliances, heating, cooking and/or hot water.

In some examples, the associating of the proportion of the received energy consumption data to the respective predetermined categories associated with the devices, comprises associating in the predetermined categories of devices comprise, at least one of:

Appliances,

Cooking,

Heating,

Cooling,

Hot Water,

Entertainment,

Lighting.

The associating may be performed for a predetermined period of time, for example a billing period such as a month or a quarter.

The energy consumptions associated with the sub-categories are respectively summed together, over the above predetermined period of time (such as a month or a billing period), in order to determine the proportions, for each category, with respect to the overall energy consumption of the property. Therefore, in some examples, the energy consumptions associated with the respective sub-categories Heating, Cooking, Hot Water, Entertainment and Lighting are summed together to obtain the respective proportions in the respective categories Heating, Cooling, Cooking, Hot Water, Entertainment and Lighting. In some examples, the associating may comprise summing the energy consumptions corresponding to the sub-categories associated with the larger devices, the smaller devices and the baseload to obtain the proportion in the category Appliances.

The method may further comprise outputting a message to a user, such as a breakdown (as a percentage and/or a monetary value) associated with billing data (such as an invoice sent to the client) or a warning (such as a SMS message indicating an abnormal consumption—such as "oven left on" or "£500 limit reached"), based on the association.

The disclosure may have other applications, such as grid management, energy consumption management, guidance to clients (for example for non-peak times), trend analysis, as non-limiting examples.

Modifications and Variations

In some examples, the links 30 and 40 may be any communications network (such as the Internet or a mobile telephony network, using technology such as wired, such as cable and/or Ethernet, or wireless, such as mobile telephony or Wi-Fi technologies, as non-limiting examples.

In example embodiments, the system 10 may be configured as one or more networks. Additionally, networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In example embodiments, elements of the system 10 may be coupled to one another through one or more interfaces employing any suitable connection (wired or wireless), which provides a viable pathway for electronic communications. Additionally, any one or more of these elements may be combined or removed from the architecture based on particular configuration needs. The system 10 may include a configuration capable of transmission control protocol/Internet protocol (TCP/IP) communications for the electronic transmission or reception of packets in a network. The system 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various elements.

In example embodiments, components of the system 10 may use specialized applications and hardware. The system 10 can use Internet protocol (IP) technology.

In example implementations, at least some portions of the system 10 may be implemented in software. In some embodiments, one or more of these portions may be implemented in hardware, provided external to these elements, or consolidated in any appropriate manner to achieve the intended functionality. In still other embodiments, these elements may include any suitable algorithms, hardware, software, components, modules, interfaces, or objects that facilitate the operations thereof.

In a particular implementation, the system 10 is a server provisioned to perform the activities discussed herein. A server may be located on a single real or virtual location, but may also distributed on a number of different real or virtual locations.

In some of example embodiments, one or more memory elements (e.g., the memory element 11) can store data used for the operations described herein. This includes the memory element being able to store software, logic, code, or processor instructions that are executed to carry out the activities described in this disclosure.

A processor can execute any type of instructions associated with the data to achieve the operations detailed herein in this disclosure. In one example, the processor 12 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, components in the system 10 can include one or more memory elements (e.g., the memory element 11) for storing information to be used in achieving the operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this disclosure should be construed as being encompassed within the broad term 'processor.'

Additionally, some of the processors and memory elements associated with the system may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. Countless possible design configurations can be used to achieve the operational objectives outlined here. Accordingly, the associated infrastructure has a myriad of substitute arrangements, design choices, device possibilities, hardware configurations, software implementations, equipment options, etc.

Although the present disclosure has been described in detail with reference to particular arrangements and configurations, these example configurations and arrangements may be changed significantly without departing from the scope of the present disclosure.

The invention claimed is:

1. A method for determining operation of one or more devices of a property using one or more electricity and/or gas meters associated with the property, the method comprising:
   receiving, at least hourly and over a predetermined monitoring period of time of at least one half day, energy consumption data from one or more electricity and/or gas meters associated with a property comprising one or more devices comprising larger devices and/or smaller devices, the energy consumption data specifying energy consumption by the devices;
   receiving context information data about the property, wherein the context information data about the property comprises information about the environment of the property including:
      at least one of a time of the day and a period of the year, and
      at least one of: one or more weather readings; a temperature associated with the outside temperature of the property; sun radiation in relation to the property; and cloud coverage in relation to the property;
   retrospectively determining, in the received energy consumption data, one or more positive energy consumption variations indicative of switching on of one or more of the devices and/or one or more negative energy consumption variations indicative of switching off of one or more of the devices;
   identifying one or more events associated with the devices, based on the determined variations, by matching one or more positive variations with one or more negative variations;
   classifying the identified events into predetermined sub-categories associated with the devices, based on the energy consumption data and the context information data;
   wherein the classifying comprises:
      classifying the identified events into larger events and smaller events, based on the energy magnitude of the identified events;
      classifying the events determined as larger events into a first set of predetermined sub-categories associated with the devices, comprising at least a predetermined sub-category associated with the smaller devices, the classifying comprising, for each of the events determined as larger events:
         using a first classifier comprising a vector classifier using model-based clustering and expectation-maximization in an n-dimensional space, the n-dimensions comprising at least:
            a time of the event,
            an energy magnitude of the event, and
            a likelihood of the event being a heating or a cooling event, wherein the likelihood of the event being a heating or a cooling event is determined based on the received context information data; and
      classifying the energy consumption data, received from electricity meters and associated with
         the events determined as smaller events; and
         the larger events classified into the predetermined sub-category associated with the smaller devices,
      into a second set of predetermined sub-categories associated with the smaller devices;
   associating a proportion of the energy consumption specified by the received energy consumption data to respective predetermined categories associated with the devices, based on the classification in the sub-categories; and
   determining operation of one or more devices of the property, based on the associating.

2. The method of claim 1, wherein the context information about the property further comprises at least one of:
   information about a location of the property, comprising at least one of: a ZIP code, a postal code, GPS coordinates or an address;
   information about a fuel type of the property, comprising one of: electricity, gas, both or none;
   information about a profile of the property, comprising at least one of: a fuel type for cooking in the property, a fuel type for heating or cooling the property, and a fuel type for hot water in the property;
   electricity and/or gas information about the property, comprising at least one of: the line voltage in at least part of the property or data from dedicated sensors or devices configured to monitor energy consumption and/or operation of one or more devices;
   information about the devices, comprising at least one of: the type of the devices and the mode of operation of the devices; and
   information about clients associated with the property, comprising at least one of: number of clients, and location of the clients.

3. The method of claim 2, comprising receiving context information about the devices based on history of browsing and/or usage of devices associated with users associated with the property.

4. The method of claim 1, wherein the receiving of the energy consumption data further comprises:
   periodically receiving readings from the electricity and/or gas meters; or
   receiving real-time or near real-time readings.

5. The method of claim 4, wherein the period for receiving the readings is of the order of:
   one hour, such as every hour or half hour, or of the order of
   a minute, such as every ten minutes, two minutes or minute, or of the order of
   a second, such as every 30 seconds, 10 seconds or a second.

6. The method of claim 1, the predetermined monitoring period of time is of the order of:
   a year, such as a year or a half year, or of the order of
   a month, such as 1 month or a half month, or of the order of
   a day, such as 7 days, a day or a half day.

7. The method of claim 1, wherein the determining of the energy consumption variations comprises at least one of:

defining edges between consecutive readings received from the electricity and/or gas meters, and merging a plurality of consecutive, similar, determined variations.

8. The method of claim 1, wherein the identifying of the one or more events comprises at least one of:
ranking the identified variations based on their respective energy magnitude, and
searching for matching variations within a predetermined search period, and
searching for a match to the positive variations by iterations in successive turns, starting with the largest energy magnitude determined variation and continuing in decreasing energy magnitude of variation, and
removing energy consumption data associated with an identified event from the received energy consumption data, and
performing one or more iterations on the energy consumption data of the step of identifying one or more events based on the determined variations.

9. The method of claim 1, wherein the n-dimensions further comprise at least one of:
a duration of the event,
a fuel type of the event
likelihood of the event being a heating or a cooling event.

10. The method of claim 1, wherein the first set of sub-categories comprises at least one of:
Smaller Appliances,
Larger Appliances,
Heating,
Cooling,
Cooking, and/or
Hot Water.

11. The method of claim 1, wherein the classifying of the energy consumption data into a second set of predetermined sub-categories comprises:
using a second classifier using at least one of a Support Vector Machine, Bayesian inference and/or a vector classifier using expectation-maximization in an n-dimensional space.

12. The method of claim 11, wherein the vector classifier using expectation-maximization in an n-dimensional space is based on a second set of predetermined assumptions.

13. The method of claim 12, the second vector classifier classifies the energy consumption data in an n-dimensional space,
wherein the n-dimensions comprise at least one of:
time of the event,
energy magnitude of the event, and
likelihood of the event being a lighting event.

14. The method of claim 1, wherein the second set of sub-categories comprises at least one of:
Baseload, such as fridge;
Entertainment, and/or
Lighting.

15. The method of claim 1, wherein the predetermined categories associated with the devices comprise, at least one of:
Appliances,
Cooking,
Heating,
Cooling,
Hot Water,
Entertainment, and/or
Lighting.

16. The method of claim 15, wherein the associating of the proportion to the predetermined category Appliances comprises:
summing the energy consumptions corresponding to the sub-categories associated with the larger devices, the smaller devices and a baseload in the received energy consumption data.

17. The method of claim 1, further comprising outputting information associated with the associating, such as a breakdown associated with billing data or a warning.

18. A computer readable medium comprising software code adapted, when executed on a data processing apparatus, to perform a method as set out in claim 1.

19. A system for determining operation of one or more devices of a property using one or more electricity and/or gas meters associated with the property, the system comprising a processor and associated memory configured to perform operations including:
receiving, at least hourly and over a predetermined monitoring period of time of at least one half day, energy consumption data from one or more electricity and/or gas meters associated with a property comprising one or more devices comprising larger devices and/or smaller devices, the energy consumption data specifying energy consumption by the devices;
receiving context information data about the property, wherein the context information data about the property comprises information about the environment of the property including:
at least one of a time of the day and a period of the year, and
at least one of: one or more weather readings; a temperature associated with the outside temperature of the property; sun radiation in relation to the property; and cloud coverage in relation to the property;
retrospectively determining, in the received energy consumption data, one or more positive energy consumption variations indicative of switching on of one or more of the devices and/or one or more negative energy consumption variations indicative of switching off of one or more of the devices;
identifying one or more events associated with the devices, based on the determined variations, by matching one or more positive variations with one or more negative variations;
classifying the identified events into predetermined sub-categories associated with the devices, based on the energy consumption data and the context information data;
the classifying operation being configured to:
classify the identified events into larger events and smaller events, based on the energy magnitude of the identified events;
classify the events determined as larger events into a first set of predetermined sub-categories associated with the devices, comprising at least a predetermined sub-category associated with the smaller devices, the classifying comprising, for each of the events determined as larger events:
using a first classifier comprising a vector classifier using model-based clustering and expectation-maximization in an n-dimensional space, the n-dimensions comprising at least:
a time of the event,
an energy magnitude of the event, and
a likelihood of the event being a heating or a cooling event, wherein the likelihood of the event being a heating or a cooling event is determined based on the received context information data; and classify the energy consumption data, received from electricity meters and associated with
- the events determined as smaller events; and
- the larger events classified into the predetermined sub-category associated with the smaller devices, into a second set of predetermined sub-categories associated with the smaller devices; the operations further comprising:

associating a proportion of the energy consumption specified by the received energy consumption data to respective predetermined categories associated with the devices, based on the classification in the sub-categories; and determining operation of one or more devices of the property, based on the associating.

* * * * *